United States Patent
De Filippis (10) Patent No.: US 9,912,211 B2
(45) Date of Patent: Mar. 6, 2018

(54) ELECTRICAL MACHINE

(71) Applicant: SPAL AUTOMOTIVE S.r.l., Correggio (Reggio Emilia) (IT)

(72) Inventor: Pietro De Filippis, Varazze (IT)

(73) Assignee: SPAL AUTOMOTIVE S.R.L., Correggio (IT)

( * ) Notice: Subject to any disclaimer, the term of this patent is extended or adjusted under 35 U.S.C. 154(b) by 249 days.

(21) Appl. No.: 14/765,146

(22) PCT Filed: Feb. 11, 2014

(86) PCT No.: PCT/IB2014/058904
§ 371 (c)(1),
(2) Date: Jul. 31, 2015

(87) PCT Pub. No.: WO2014/125412
PCT Pub. Date: Aug. 21, 2014

(65) Prior Publication Data
US 2016/0006322 A1    Jan. 7, 2016

(30) Foreign Application Priority Data

Feb. 14, 2013  (IT) .............................. BO2013A0063

(51) Int. Cl.
*H02K 9/22* (2006.01)
*H02K 11/00* (2016.01)
(Continued)

(52) U.S. Cl.
CPC ........... *H02K 9/22* (2013.01); *H02K 11/0094* (2013.01); *H02K 11/33* (2016.01); *H02K 15/00* (2013.01); *H02K 5/18* (2013.01)

(58) Field of Classification Search
CPC ....................................................... H02K 9/22
See application file for complete search history.

(56) References Cited

U.S. PATENT DOCUMENTS 5,889,378 A * 3/1999 Hayashi ............... B62D 5/0406
                                                                318/293
6,081,056 A * 6/2000 Takagi ..................... H02K 5/08
                                                               310/216.137
(Continued)

FOREIGN PATENT DOCUMENTS

GB       2174253        10/1986
WO    2013/008180        1/2013

OTHER PUBLICATIONS

Office Action dated Feb. 15, 2017 from counterpart Chinese Patent Application No. 2014800088364.
(Continued)

*Primary Examiner* — Robert W Horn
(74) *Attorney, Agent, or Firm* — Shuttleworth & Ingersoll, PLC; Timothy J. Klima (57) ABSTRACT

A rotary electrical machine incorporating an electronic module that includes a printed circuit mounted with a plurality of surface mounted electronic components and a plurality of pin-through-hole electronic components; the electrical machine includes a dissipator for dispersing the heat generated by the electronic module; the surface mounted electronic components and the pin-through-hole electronic components are mounted between the printed circuit and the dissipator; the electronic module also includes a transferring element, also mounted between the printed circuit and the dissipator, in thermal contact with at least one of the surface mounted electronic components; the transferring element is designed to disperse the heat generated by the surface mounted electronic components towards the dissipator with the aid of a thermally conductive and electrically isolating filler material inserted between the transferring element and the dissipator.

17 Claims, 5 Drawing Sheets

(51) Int. Cl.
*H02K 15/00* (2006.01)
*H02K 11/33* (2016.01)
*H02K 5/18* (2006.01)

(56) References Cited

U.S. PATENT DOCUMENTS

| | | | | |
|---|---|---|---|---|
| 6,099,324 | A * | 8/2000 | Janssen | H02K 5/225 |
| | | | | 361/785 |
| 6,394,767 | B1 * | 5/2002 | Matsumoto | F04D 25/08 |
| | | | | 310/71 |
| 6,906,483 | B2 * | 6/2005 | Tominaga | B62D 5/0406 |
| | | | | 318/280 |
| 6,949,849 | B1 * | 9/2005 | Wright | H02K 11/33 |
| | | | | 310/64 |
| 7,081,694 | B2 * | 7/2006 | Hans | H02K 11/33 |
| | | | | 310/64 |
| 7,207,187 | B2 * | 4/2007 | Funahashi | F01C 21/10 |
| | | | | 62/113 |
| 7,462,965 | B2 * | 12/2008 | Natsuhara | H02K 5/15 |
| | | | | 310/64 |
| 7,812,487 | B2 * | 10/2010 | Bi | H05K 7/20409 |
| | | | | 310/64 |
| 8,506,264 | B2 * | 8/2013 | Horng | F04D 25/0606 |
| | | | | 310/52 |
| 9,148,044 | B2 * | 9/2015 | De Filippis | F04D 25/08 |
| 9,431,881 | B2 * | 8/2016 | Clendenen | H02K 11/33 |
| 9,504,192 | B2 * | 11/2016 | Hansen | H05K 7/209 |
| 9,595,854 | B2 * | 3/2017 | Klopp | H02K 5/225 |
| 2004/0239196 | A1 * | 12/2004 | Miura | H02K 7/1025 |
| | | | | 310/77 |
| 2008/0073986 | A1 * | 3/2008 | Lee | H02K 5/18 |
| | | | | 310/71 |
| 2012/0039729 | A1 | 2/2012 | Horng et al. | |
| 2015/0084445 | A1 * | 3/2015 | DeFilippis | H02K 1/04 |
| | | | | 310/43 |
| 2015/0207379 | A1 * | 7/2015 | Muller | H02K 5/02 |
| | | | | 310/43 |
| 2016/0006322 | A1 * | 1/2016 | De Filippis | H02K 9/22 |
| | | | | 310/64 |
| 2016/0037659 | A1 * | 2/2016 | Yamanaka | H02K 11/0073 |
| | | | | 310/68 R |
| 2016/0087511 | A1 * | 3/2016 | De Filippis | H02K 11/0073 |
| | | | | 310/68 D |
| 2016/0134178 | A1 * | 5/2016 | Acinas Lope | B62D 5/0406 |
| | | | | 310/64 |
| 2016/0150662 | A1 * | 5/2016 | Maier | H02K 11/33 |
| | | | | 361/719 |
| 2016/0192535 | A1 * | 6/2016 | Yamanaka | H01L 23/36 |
| | | | | 310/52 |
| 2016/0218596 | A1 * | 7/2016 | Hayashi | H02K 9/22 |
| 2017/0013740 | A1 * | 1/2017 | Mergener | H05K 1/181 |

OTHER PUBLICATIONS

International Search Report dated Jul. 2, 2014 from App No. PCT/IB2014/058904.
Chinese Office Action dated Feb. 15, 2017 from counterpart CN Patent App 201480008836.4.
Chinese Office Action dated Oct. 27, 2017 from counterpart CN Patent App 201480008836.4.

* cited by examiner

ELECTRICAL MACHINE

TECHNICAL FIELD

This invention relates to a rotary electrical machine and a method for its assembly with reference in particular to the integrated electronic control module.

BACKGROUND ART

In general, a rotary electrical machine comprises a casing having inside a stator, rigidly connected to the casing, and a rotor, for example with permanent magnets, rotatably connected to the casing.

An example of a prior art electrical machine used as a reference for the present patent is described in the application WO20133008180 in the name of the same applicant.

An electronic module or electronic control module, connected to the stator, comprising a printed circuit and a plurality of active and passive electronic components forming a power section and a plurality of electronic signal components forming a control section, mounted on the printed circuit.

A cap closes the casing to form a closed container from which connection terminals protrude for the power supply and control connections of the control electronics.

The electrical machines used as reference for this invention are of the enclosed type known in particular as the sealed type, that is, sealed electrical machines.

One of the principle difficulties of the sealed type of electrical machine is the dispersal of the heat generated by the electronic module during operation of the electrical machine.

A solution designed to overcome this difficulty is described in the document already cited WO20133008180 in the name of the same applicant.

In this solution the cap of the electrical machine forms a transferring element, that is, a component for dispersing the heat generated by the electronic module; the power and signal electronic components are mounted on the side of the printed circuit facing the cap.

In addition, in this solution a thermally conductive paste is inserted between the electronic components and the cap so as to act as a dissipator thereby maximising the heat exchange between the cap and the components.

Today, the market specifies electrical machines, particularly those of the sealed type, which provide greater efficiency and higher power outputs than electrical machines of the known type and provide this higher performance in units of the same size.

The development of these high performance electrical machines has lead to the adoption, in the electronic drive module, of electronic power components with ever lower internal resistances. The purpose of this development is to limit the losses due to the Joule effect.

However, despite the relatively low internal resistance of the electronic power components, especially in high power applications (those with ratings of more than a kilowatt) and in applications with low voltage power supplies (operating with just a few volts), the circulating currents in the electronic power components can cause relatively high losses due to the Joule effect. A further basic design constraint is that the heat generated by each electronic power component must not decrease the efficiency of the electronic module of the machine.

The printed circuit in particular appears to be the weak link in the electronic module because its maximum operating temperature is lower than that of the electronic power components mounted and soldered onto the printed circuit itself.

DISCLOSURE OF THE INVENTION

In this context the primary technical purpose of the present invention is to provide a rotary electrical machine which disperses the heat generated internally and in particular the heat produced by the electronic control module and to do this more effectively than prior art devices in order to increase thermal reliability.

This technical purpose and the aims specified are substantially achieved by an electrical machine having technical features as disclosed herein.

BRIEF DESCRIPTION OF DRAWINGS

Other features and advantages of the invention are more apparent in the detailed description below, with reference to a non-limiting and non-exclusive preferred embodiment of a rotary electrical machine, as illustrated in the accompanying drawings, in which.

DETAILED DESCRIPTION OF PREFERRED EMBODIMENTS OF THE INVENTION

With reference to the accompanying drawings, the numeral 1 indicates a rotary electrical machine according to the present invention.

The machine 1 in the preferred embodiment is an electric motor of the sealed type, that is, without any openings for access to the inside, to which express reference will hereinafter be made but without thereby limiting the scope of the invention.

The electrical machine 1 will be described in detail solely for the parts necessary for the understanding of this invention.

The machine 1 comprises a casing 2 and a cap 3 for closing the casing 2 to form, with the casing 2, a case or closed container 4.

The electrical machine 1 comprises a stator 5 fixed to the casing 2 and comprising an electrical winding 6 and a rotor 7 inserted in the case 4 and attached to the case in a rotary manner.

The machine 1 has its own axis of rotation R around which the rotor 7 rotates.

An example of the stator 5 is described in the patent EP2215705 in the name of the same applicant which is referred to herein in its entirety for the purposes of a complete description.

Figures 1, 2:
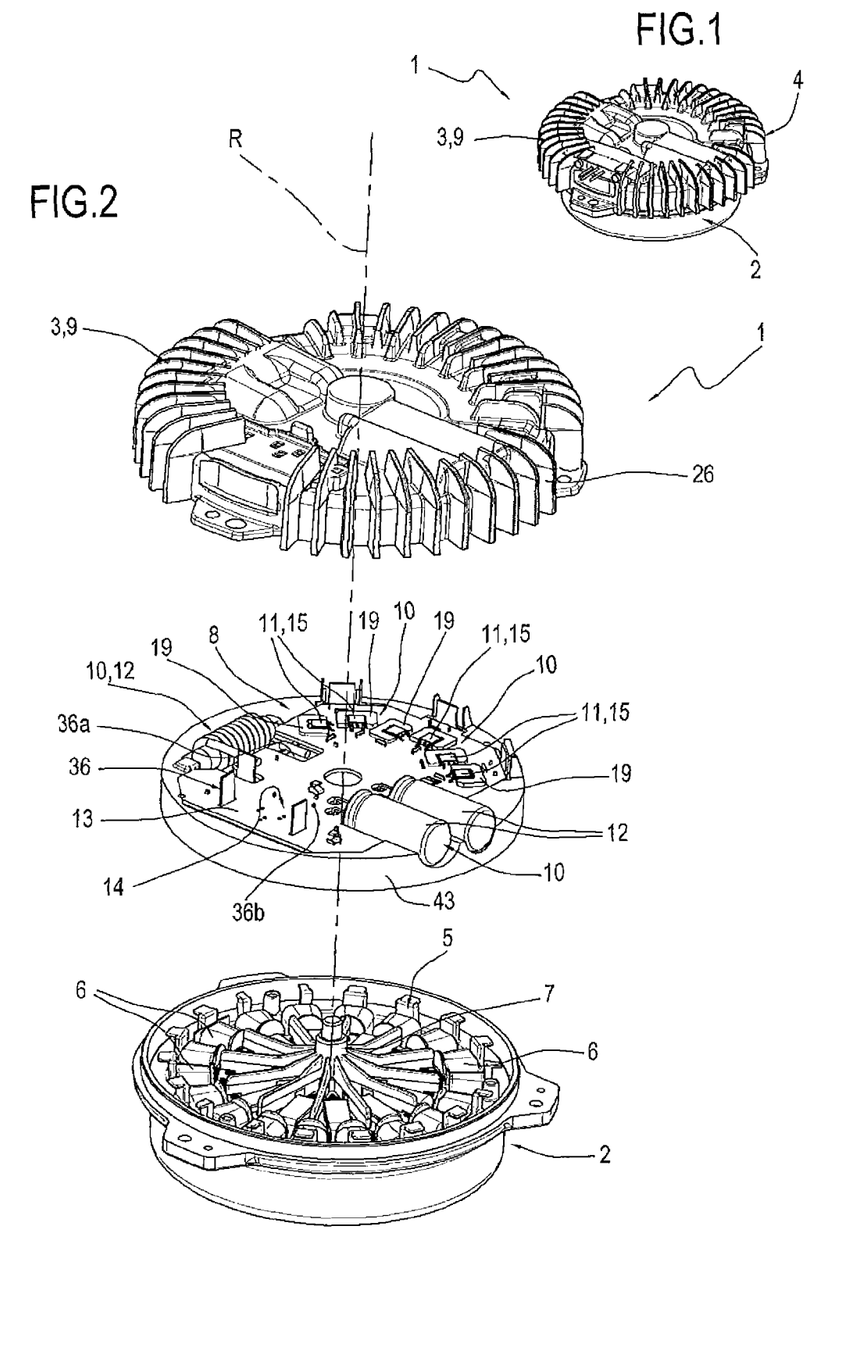
FIG. 1 shows a perspective view of a rotary electrical machine according to this invention.
FIG. 2 is an exploded view of the machine in FIG. 1 with some parts removed to better illustrate others.
Figure 3:
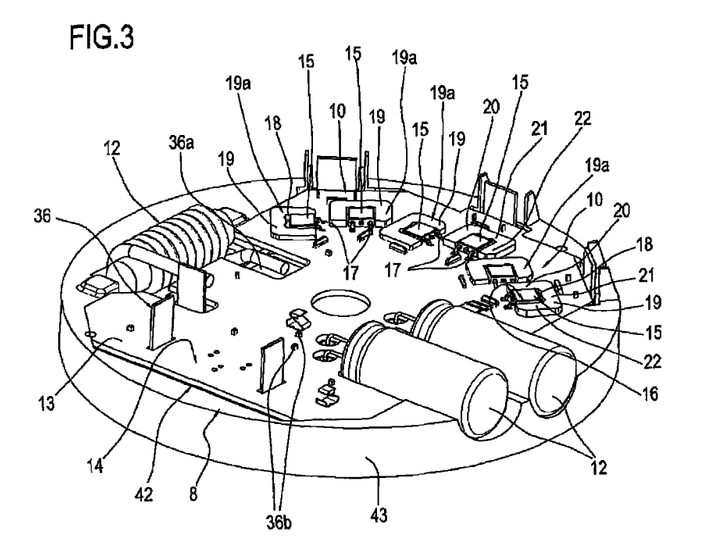
FIG. 3 is a perspective view of the electronic module of the rotary electrical machine with some parts removed to better illustrate others.
Figure 4:
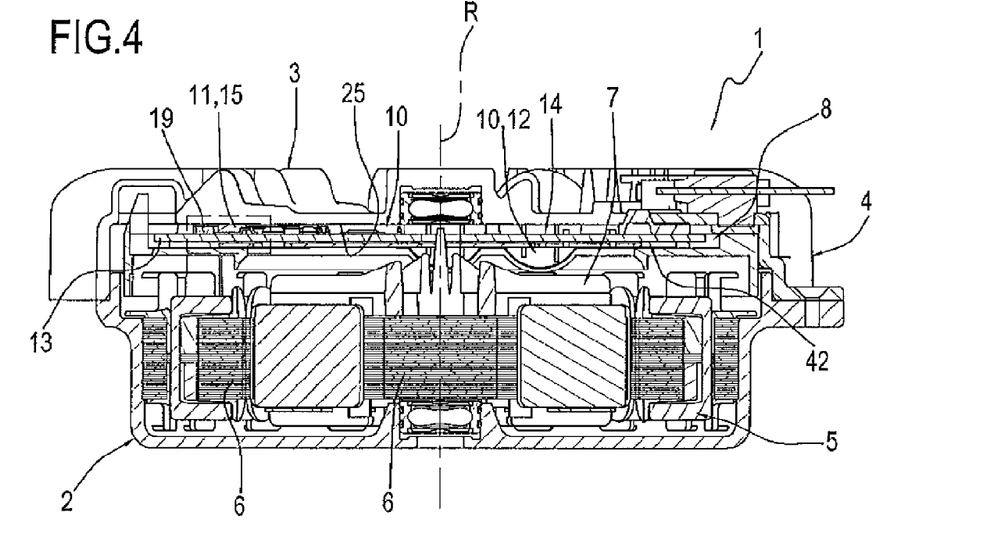
FIG. 4 is a cross-section of the machine in FIG. 1.

As illustrated in FIGS. 2 and 3, the electrical machine 1 comprises an electronic module 8, inserted at least partly in the casing 2, for supplying the electrical winding 6.

The electrical machine 1 also comprises a dissipater 9, in other words dissipator 9 for dissipating the heat generated inside the case 4 by the electronic module 8 in particular.

In the embodiment illustrated, the transferring element is formed by the cap 3 for closing the casing 2.

The electronic module 8 comprises a plurality of electronic components 10.

The electronic components 10 include the surface-mounted electronic components 11, also known as SMD electronic components, and pin-through-hole mounted electronic components 12 also known as PTH electronic components.

The electronic module 8 of the electrical machine 1 comprises a printed circuit 13.

The printed circuit 13 is substantially known as a PCB, that is, a Printed Circuit Board.

In particular in the embodiment described in the example, the electronic components 10 are both SMD type 11 and PTH type 12 and are mounted on the same side 14 of the printed circuit 13, also defined as the component side 14 of the printed circuit 13.

The component side 14 of the printed circuit 13 forms the first side 14 of the electronic module 8.

The electronic components 10 are mounted on the first side 14 of the electronic module 8 so that they face towards the cap 3 and are facing it.

The electronic module 8 also comprises a plurality of conductor tracks 36, such as the electronic module 8 described and illustrated in the document WO20133008180 by the same applicant, which implement the direct connections between all the surface mounted electronic components 11 and the pin-through-hole electronic components 12.

The conductor tracks 36 are positioned on a second or solder side 42 opposite the component side 14 of the printed circuit 13. In other words, the assembly consisting of the printed circuit 13, the electronic components 10, both SMD 11 and PTH 12, and the conductor tracks 36, form the electronic module 8 comprising the control circuit of the machine 1 which controls the power supply.

As illustrated, the conductor tracks 36 comprise a plurality of connection tabs 36a and connection terminals 36b. The connection terminals 36a and 36b are soldered to the printed circuit 13.

The SMD electronic components 11 comprise MOSFETs 15. The MOSFETs 15 are SMD electronic components 11 of the power type.

The MOSFETs 15 are substantially of the known type and are therefore not described in detail here. They are electronic components having a case 16 with a substantially parallelepiped shape and have a plastic part.

For the sake of clarity the following description refers specifically to MOSFETs 15 without however in any way limiting the scope of this invention.

Each MOSFET 15 has a defined height h1 which in the solution shown in the example extends in a direction parallel to the axis of rotation R.

In general the height h1 extends in a direction which is substantially perpendicular to the printed circuit 13.

Each MOSFET 15 has its own power connection terminals 17 and 18.

The connection terminals are defined as source terminals 17 and drain terminals 18.

The terminals 17 and 18 of each MOSFET 15 are on opposite sides of the case 16.

The drain terminal 18 of each MOSFET comprises a tab which which protrudes from the case 16.

According to the present invention, the electronic module 8 comprises a plurality of transferring elements 19 one for each MOSFET 15.

In other words, as will be explained below, the electronic module 8 comprises a transferring element 19, preferably comprising an element with a high thermal conductivity, for each MOSFET 15.

Advantageously, the transferring element 19 is also an electronic component of the SMD or surface mounted device type.

Preferably the transferring element 19 is a component with a high level of electrical conductivity.

In addition, each transferring element 19 is preferably connected directly to its respective MOSFET 15.

The transferring elements 19 each have an associated electronic power component 11 of the surface mounted type which comprises a respective MOSFET 15 and which is designed to increase the surface area for heat exchange and to enable the transmission of the heat generated inside the component towards the dissipator 9.

In particular each transferring element 19 is soldered to the component side 14 of the printed circuit 13 so that it also is facing the cap 3.

Each transferring element 19 is soldered to one of the drain terminals 18 of the MOSFET 15.

This means that during operation of the electrical machine 1, the heat generated by each MOSFET 15 can easily flow towards its corresponding transferring element 19 given that the soldering between the terminal 18 and the transferring element 19 provides an extremely low contact thermal resistance.

Preferably, the transferring element 19 is C-shaped so that it partially frames or surrounds the MOSFET 15 to which it is connected.

In particular, the transferring element 19 comprises a first arm 20, a second arm 21 and a third arm 22 all connected in succession to each other.

The second arm 21 is at right angles to the first arm 20 and the third arm 22 is between the other two arms.

The MOSFET 15 is soldered to the second arm 21 of its corresponding transferring element 19.

The first arm 20 and the third arm 22 run parallel to each other and extend along the sides of the MOSFET 15.

Advantageously, the transferring element 19 has recesses 23 for receiving the terminal 18 of the MOSFET 15 thus facilitating the connection by soldering between the two components.

Each transferring element 19 has a defined height h2 which in the solution shown in the example extends in a direction parallel to the axis of rotation R.

In general, the height h2 extends in a substantially perpendicular direction to the printed circuit 13.

Advantageously, the machine 1 comprises a layer of thermally conductive gap filler between the transferring element 19 and the dissipator 9.

Advantageously the filler material used is electrically isolating.

In a preferred embodiment provided as a non-limiting example, the thermally conductive material is a paste 24 to which reference will be made but which will not be described in detail. The paste is inserted between the transferring element 19 and the dissipator 9. The MOSFETs 15 can be brought into contact with the cap 3 by means of the plastic part of the MOSFET case 16 (without creating electrical short-circuit problems). Preferably there should also be direct contact between the transferring element 19 and the tab 18 of the MOSFET 15. In this situation the insertion of a filler material layer, such as a thermally conductive paste 24 of the type commonly known as thermally conductive gap filler whose thickness is within the range of the height values h1 and h2, between the transferring element 19 and the cap 3 creates a preferential route for the heat dissipated by the MOSFET 15.

The transferring element 19 acts as a thermal joint, that is, a means favouring the transfer of the heat generated by the MOSFET 15 towards the cap 3.

Each transferring element 19 has an upper face 19a, facing towards the cap 3, which forms the heat exchange surface by which the transferring element 19 transfers most of the heat generated by the MOSFET 15 to the cap 3 which, as has already been said, acts in turn as a dissipator 9.

The area of the surface 19a is made as large as possible within the design constraints for size so as to minimise the resistance to the passage of heat.

It should be noted that some part of the heat generated by each MOSFET 15 is transferred to the cap 3 by the case 16 facing it which is preferably in mechanical contact with the cap 3.

However, most of the heat generated by each MOSFET 15 is transferred to the cap by the corresponding transferring element 19.

In other words, the upper face 19a of each transferring element 19 greatly increases the heat transfer surface of the MOSFET 15.

Advantageously, most of the heat generated by the MOSFETs 15 is transferred to the dissipator 3 by the transferring element 19.

This arrangement prevents the heat generated by the MOSFETs 15 from being transferred to the printed circuit 13 on which the MOSFETs 15 are mounted and soldered.

Preferably, the transferring element 19 is made from a material, such as copper, which has high thermal and electrical conductivity.

In order to optimise the thermal contact between the cap 3, acting as a transferring element, the MOSFETs 15 and the transferring element 19 mounted on the component side 14 of the printed circuit 13, the cap 3 has at least one contact 25 defined by a substantially flat portion of the internal surface of the cap 3.

The insertion of a thermally conductive gap filler such as the paste 24, maximises the transfer of heat between the electronic components 10 and in particular between the MOSFETs 15 and the corresponding transferring element 19, mounted on the component side 14 of the printed circuit 13 and the cap 3.

Figure 5:
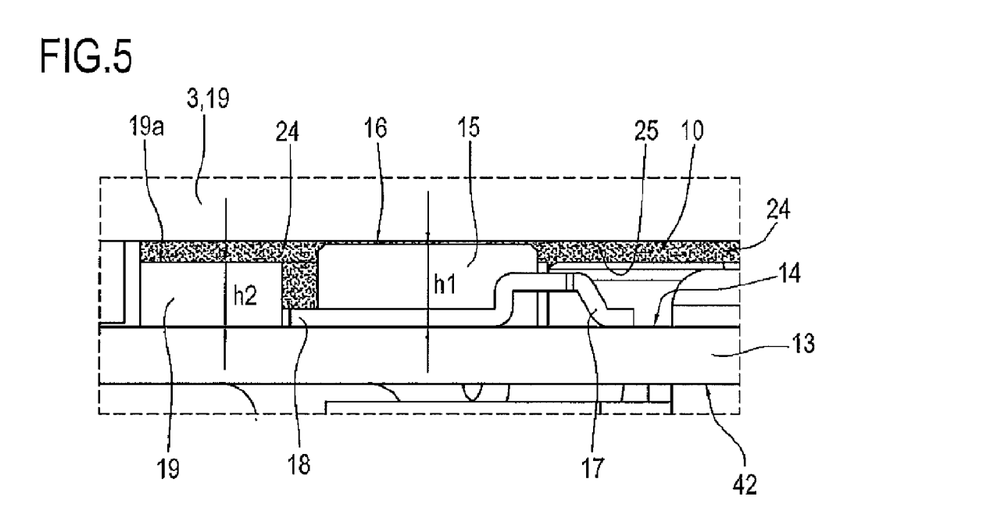
FIG. 5 is a scaled-up view of a detail of the cross-section in FIG. 4.

As the detail in FIG. 5 shows, the thermally conductive paste 24 fills any empty spaces remaining after assembly between the electronic components 10, the high thermal and electrical conductivity transferring elements 19 and the flat contact 25.

Advantageously, the height h2 of each transferring element 19 is less than the height h1 of the case 16 of the corresponding MOSFET 15, so that the MOSFETs 15 act as spacer elements separating the cap 3 from the transferring elements 19, thus preventing any short circuits which could occur following direct contact between the transferring elements 19, elements with high electrical and thermal conductivity, and the cap 3 of the machine 1.

In the case where the height h2 of the transferring element 19 is greater than the height h1 of the case 16 of the MOSFET 15, an alternative arrangement for preventing the short circuits resulting from direct mechanical contact between the transferring element 19 and the cap 3 would be to insert a thermally and electrically conductive material such as Sil-Pad between the cap 3 and the upper face 19a of the transferring element 19.

In a further embodiment, not illustrated here, the transferring element 19 is thermally conductive but not electrically conductive and the height h2 of the transferring element is greater than or equal to the height h1 of the MOSFET 15 connected to the transferring element 19.

Advantageously, in this arrangement the transferring element 19 is in contact with the cap 3 and thereby directly transfers the heat generated by the corresponding MOSFET 15 to the cap 3.

The outer surface of the cap 3 has a plurality of fins 26 for dissipating the heat generated by the electronic module 8 thus maximising the dissipation surface of the dissipator 9.

In order to push the electronic module 8 towards the cap 3 and maximise heat exchange between the transferring elements 19 and the cap 3, the electrical machine 1 comprises a plurality of elastic elements pushing the electronic module 8 away from the stator 5 towards the cap 3.

A preferred example assembly of the electronic module 8 inside the machine 1 is the example described and illustrated in the document WO20133008180 by the same applicant.

The electrical machine 1 comprises a support 43, preferably made in a disc shape from plastic material, housing the electronic module 8.

The elastic pushing elements act directly on the support 43 so as to push the electronic module 8 toward the cap 3 until the cases 16 of the MOSFETs 15 make mechanical contact with the cap.

In this way the heat exchange between the electronic module and the dissipator 9 is further improved.

The method of assembling the electronic module 8 comprises a step of preparing, with known methods, the printed circuit 13.

This preparation step involves first placing a thin layer of solder paste 35 on the component side 14 of the printed circuit 13 and then placing the SMD electronic components on top of this.

Preferably the transferring element 19 is soldered before it is positioned on the printed circuit 13 in order to facilitate the soldering of this component on the electronic module in the way explained in more detail below.

The printed circuit 13 comprises a plurality of pads 27 for housing the MOSFETs 15 and their corresponding transferring elements 19.

Figure 6:
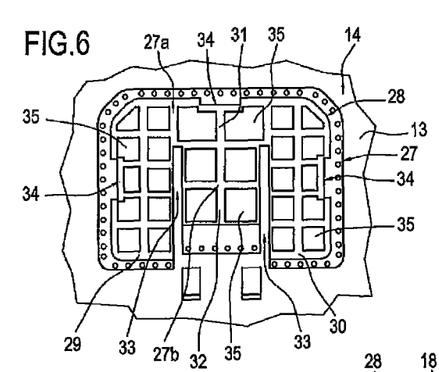
FIG. 6 is a plan view from above of a pad of the electronic module with some parts removed to better illustrate others.

FIG. 6 shows that the pad 27 is preferably formed by at least two portions, a first portion 27a and a second portion 27b, each designed to receive respectively the transferring element 19 and the MOSFET 15.

In the preferred embodiment illustrated, the first portion 27a and the second portion 27b are contiguous.

The pad is bounded by a perimeter demarcation line 28 which makes it possible to check that the transferring element 19 is correctly positioned once it has been soldered to the printed circuit 13.

In a preferred embodiment, the pad 27 is substantially E-shaped with two side sections 29 and 30 joined together by a central body 31, and an intermediate section 32, positioned between the two side sections 29 and 30, which extends from the central body 31.

The shape of the pad 27 matches the shape of the assembly formed by the transferring element 19 and its corresponding MOSFET 15.

In effect, the transferring element 19 is C-shaped where the first and third arms 20 and 22 are designed to fit over the side sections 29 and 30 of the pad 27 and the second arm 21 is designed to fit over the central body 31 of the pad 27; the MOSFET 15 is designed to fit over the intermediate section 32 when it is soldered to the second arm 21 of the transferring element 19.

As a result, the side sections 29 and 30 and the central body 31 define the first portion 27a and the intermediate section 32 defines the second portion 27b.

From the description thus far it can be deduced that the shape of the pad 27 is closely dependent on the shape of the transferring element 19 and the location of the connection between the MOSFET 15 and its corresponding transferring element 19.

The pad 27 has a pair of cuts 33, extending mainly lengthways, preferably parallel to each other along the side of the intermediate section 32.

In particular, in the preferred embodiment illustrated here, each cut 33 is located between each of the side sections 29 and 30 of the pad 27 and the intermediate section 32.

Advantageously, the cuts 33 act as guides for the MOSFET 15 which during soldering travels in a lengthways direction parallel to the cuts 33 to then connect to its corresponding transferring element 19.

The pad 27 has a plurality of recesses 34 designed to prevent any rotation relative to the transferring element 19 during soldering of the printed circuit 13.

In particular, the recesses 34 are located along the sides of the first portion 27a designed to receive the transferring element 19.

The solder paste 35 is placed inside the perimeter of the pad 27.

The solder paste 35 is applied in polygonal-shaped areas.

The areas of solder paste 35 are distributed so that they uniformly cover the first portion 27a and the second portion 27b of the pad 27.

Figure 7:
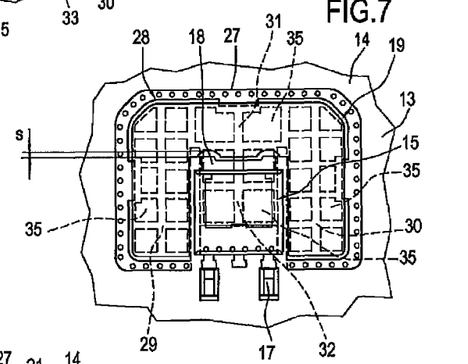
FIG. 7 is a plan view from above of the pad in FIG. 6 of the electronic module showing the layout of its electronic components.

The method has a step for positioning the transferring element 19 on the first portion 27a and a step for positioning the MOSFET 15 to be connected to the transferring element 19 of the second portion 27b. As FIG. 7 shows, the MOSFET 15 is positioned at a specified distance "s" from the transferring element 19.

The MOSFET 15 is positioned at least in part on the second portion 27b of the pad 27.

The soldering step of the SMD electronic components takes place inside a controlled-temperature oven using the assembly method known as "Reflow Soldering".

The soldering takes place keeping the printed circuit 13 in a substantially horizontal position with the SMD components resting on top.

More specifically, according to the present invention the shape of the pad 27 and the position of the solder paste 35 on the pad make it possible to keep the transferring elements 19 in position while feeding forward the MOSFETs 15 towards the transferring elements.

The method involves a step for feeding the MOSFET 15 towards the transferring element 19 by an amount which is at least the same as the specified distance "s".

The stroke or travel of the MOSFETs 15 towards the transferring element 19 enables the terminal 18 to make contact with the transferring element 19 and to be soldered to it.

It should be noted that the travel of the MOSFET 15 towards the transferring element 19 is necessary in order to enable soldering given that during the step for positioning the MOSFET 15 on the printed circuit 13 the MOSFET is still physically separated from the transferring element 19 by the specified gap "s". The gap "s" is closed by moving the MOSFET 15 towards the transferring element 19.

The cuts 33 ensure that when the MOSFET 15 travels towards the transferring element 19 it does so in a straight line parallel to itself without rotating.

Figure 8:
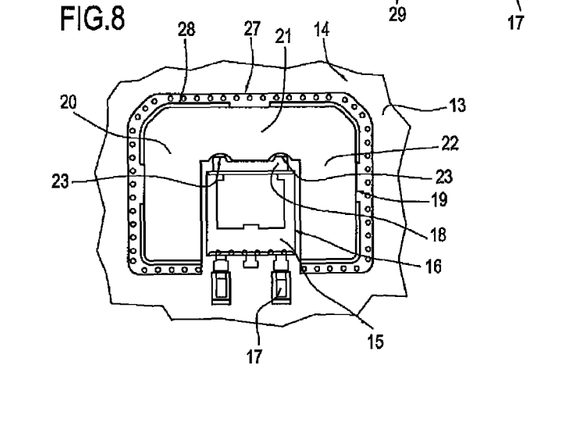
FIG. 8 is a plan view from above of the pad in FIG. 7 of the electronic module showing the electronic components soldered to each other.

FIG. 8 shows that the soldering step includes a step where the transferring element 19 approaches its corresponding MOSFET 15 and close contact takes place between the terminal 18 of the MOSFET 15 and the arm 31 of the transferring element 19.

In other words the approach step takes place during the soldering step.

During the soldering step, the transferring elements 19 and the MOSFETs 15 are soldered to their corresponding first portions 27a and 27b.

The recesses 34 prevent the rotation of each transferring element 19 with respect to the portion 27a of the pad 27 on the printed circuit 13 on which they are placed.

It is clear that the present invention overcomes the various disadvantages described above with reference to the prior art.

In effect the transferring elements 19 draw off most of the heat generated by their corresponding MOFSETs 15 and transfer it to the cap 3 from where it is then dissipated. This prevents the heat from flowing through the printed circuit 13 and causing overheating.

The transferring elements 19 efficaciously draw off the heat from their respective MOSFETs 15 thanks to the high thermal conductivity of the transferring elements 19 and the efficient exchange with the cap 3 thanks in particular to the extension of their upper faces 19a.

The MOSFETS 15 cited are connected to each other to form a power supply jumper for the machine 1; this jumper is of a substantially known type and will therefore not be described in detail here.

Advantageously, the high electrical conductivity of the transferring elements 19 means that they can also be used to make an electrical connection between the MOSFETs 15 and thereby form branches of the power jumper of the phases 41 of the machine 1.

The motor 1 is preferably a three-phase motor which means that the power jumper of the motor comprises three branches, one each for the corresponding phase 41 of the motor 1.

Figure 9:
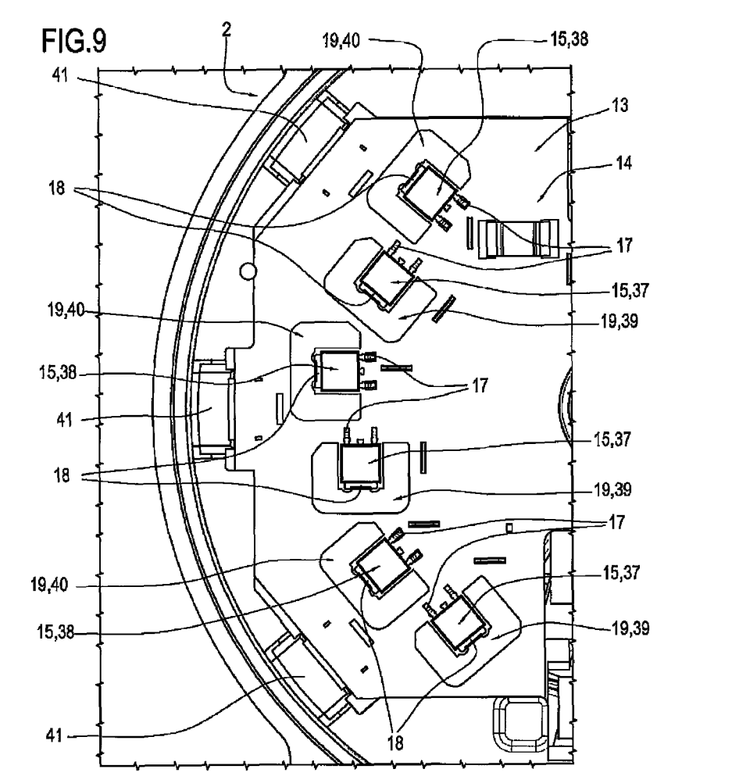
FIG. 9 is a plan view showing a portion of the electronic module in FIG. 3 with some parts removed to better illustrate others.
Figure 9A:
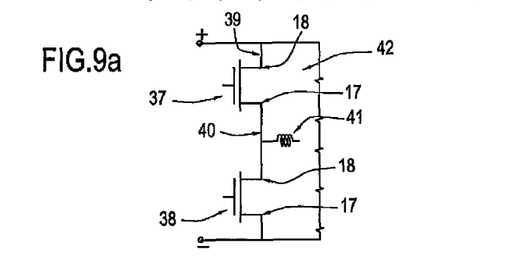
FIG. 9a is an electrical circuit diagram of a branch of a power supply jumper of the electronic module in FIG. 9 with some parts removed.

For the sake of simplicity FIGS. 9 and 9a only show a single branch 42 of the jumper. The branch is substantially of the known type and only the parts necessary for an understanding of the present invention will be described here. The figures show that the SMD electronic components 11 comprise a first MOSFET 37 and a second MOSFET 38 electrically connected to each other to form this power supply branch.

Advantageously, for any multi-phase brushless motor the power supply jumper can have as many branches 42 as the motor has phases.

A transferring element 19 is linked to the first MOSFET 37 or to the second MOSFET 38 and electrically connects the drain terminal 18 of the first MOSFET 37 to the source terminal 17 of the second MOSFET 38.

In this way the first MOSFET 37, the second MOSFET 38 and the transferring element 19 define the power supply branch of one phase 41 of the motor 1.

In particular, a first transferring element 39, soldered to the drain 18 of the first MOSFET 37, electrically connects the drain 18 of the first MOSFET 37 to the jumper power supply.

A second transferring element 40, soldered to the drain 18 of the second MOSFET 38, electrically connects the drain 18 of the second MOSFET 38 to the source 17 of the first MOSFET 37.

Advantageously, the second transferring element 40 electrically connects the drain 18 of the second MOSFET 38 and the source 17 of the first MOSFET 37 to the corresponding phase 41 of the stator winding.

It will be noted that the electrical connections between the first MOSFET 37, the second MOSFET 38, the transferring element 19 and the phase of the motor 1 are made by connecting these components to the conductor tracks 36 of the electronic module 8.

Furthermore, given that the motor 1 is a three-phase motor, each phase 41 is linked to a MOSFET pair 15 formed by the first MOSFET 37 and the second MOSFET 38.

FIG. 9 shows that the first and second MOSFETs 37 and 38 defining a power supply branch are positioned in directions which are mainly at right angles to each other.

The first and second transferring elements 39 and 40 at least partially frame their respective first and second MOSFETs 37 and 38 and are therefore also positioned in directions which are mainly at right angles to each other.

Advantageously, the position of the MOSFAT pairs 15 at right angles to each other for each phase 41 of the motor is a minimum overall configuration of the MOSFET pairs 15 and their respective transferring elements 19 on the printed circuit 13 of the electronic module 8 and at the same time is also the configuration which limits the distances of the electrical paths between the electrical components electrically connected to each other.

The invention claimed is:

1. A rotary electrical machine, having an axis of rotation, comprising:
    an electronic module, comprising a printed circuit, a plurality of SMD electronic components and a plurality of PTH electronic components;
    a dissipator for dissipating heat generated by the electronic module; the dissipator embodied as a portion of a casing of the electrical machine and including a heat sink;
    wherein the SMD electronic components and the PTH electronic components face towards the dissipator;
    wherein the electronic module comprises at least one transferring element connected to the printed circuit at a position of at least one of the SMD electronic components to transfer heat generated by the at least one of the SMD electronic components to the dissipator; the transferring element being a planar heat conducting body including a first face interfacing with the printed circuit and a second face interfacing with the dissipator and being shaped to at least partially surround the at least one of the SMD electronic components.

2. The machine according to claim 1, wherein the transferring element is connected to a corresponding SMD electronic component.

3. The machine according to claim 1, wherein the SMD electronic components and the PTH electronic components and the transferring element are located on a first side of the printed circuit.

4. The machine according to claim 1, wherein the SMD electronic components comprises a plurality of MOSFETs each of which includes terminals and where the transferring element is soldered to a first side of the printed circuit and to at least one of the terminals of one of the MOSFETs.

5. The machine according to claim 1, and further comprising a layer of thermally conductive material positioned between the transferring element and the dissipator and where the transferring element transfers the heat generated by the at least one of the SMD electronic components to the dissipator via the layer of thermally conductive material.

6. The machine according to claim 1, wherein the printed circuit comprises a pad for positioning the transferring element and the at least one of the SMD electronic components; the pad including a first portion for the transferring element and a second portion for the at least one of the SMD electronic components.

7. The machine according to claim 6, wherein the first portion and the second portion are contiguous.

8. The machine according to claim 6, wherein the first portion and the second portion are separated by at least one cut.

9. The machine according to claim 6, wherein the first portion includes a perimeter demarcation line which has at least one recess.

10. The machine according to claim 1, wherein the transferring element comprises a first arm and a second arm connected to each other in succession and where the at least one of the SMD electronic components is connected to the first arm or to the second arm.

11. The machine according to claim 1, wherein the at least one of the SMD electronic components comprises a first MOSFET and a second MOSFET and where the transferring element electrically connects the source terminal of the first MOFSET with a drain terminal of the second MOSFET; the first MOFSET, the second MOFSET and the transferring element defining a power supply branch of one phase of the electrical machine to form a power supply jumper of the electrical machine.

12. The machine according to claim 9, wherein the first and second MOSFETs defining the power supply branch of one phase of the electrical machine are positioned along directions which are mainly at right angles to each other; and the transferring element includes first and second transferring elements respectively associated with the first and second MOSFETs and which are positioned along directions which are mainly at right angles to each other.

13. The machine according to claim 1, wherein a height of the transferring element measured in a direction substantially perpendicular to the printed circuit is less than a height of the at least one of the SMD electronic components connected to the transferring element measured in a direction perpendicular to the printed circuit and where the at least one of the SMD electronic components connected to the transferring element acts as a spacer element between the dissipator and the transferring element.

14. The machine according to claim 1, wherein a height of the transferring element measured in a direction perpendicular to the printed circuit is greater than or equal to a height of the at least one of the SMD electronic components connected to the transferring element measured in a direction perpendicular to the printed circuit.

15. The machine according to claim 1, and further comprising a support housing the electronic module and elastic pushing elements operating between a stator and the support and acting directly on the support to bias the electronic module towards the dissipator and away from the stator; the electronic module comprising a plurality of conductor tracks located on a second side opposite the first side of the printed circuit.

16. A method for assembling a rotary electrical machine having an axis of rotation, comprising:
   providing an electronic module, comprising a printed circuit, a plurality of SMD electronic components and a plurality of PTH electronic components;
   providing a dissipator for dissipating heat generated by the electronic module; the dissipator embodied as a portion of a casing of the electrical machine and including a heat sink;
   providing that the SMD electronic components and the PTH electronic components face towards the dissipator;
   providing that the electronic module comprises at least one transferring element connected to the printed circuit at a position of at least one of the SMD electronic components to transfer heat generated by the at least one of the SMD electronic components to the dissipator; the transferring element being a planar heat conducting body including a first face interfacing with the printed circuit and a second face interfacing with the dissipator and being shaped to at least partially surround the at least one of the SMD electronic components;
   assembling the electronic module including applying the solder paste on the printed circuit at the pad for the transferring element and for the at least one of the SMD electronic components; the pad having a first portion for the transferring element and a second portion for the at least one of the SMD electronic components,
   positioning the transferring element on the first portion;
   positioning the at least one of the SMD electronic components to be connected to the transferring element on the second portion;
   positioning the at least one of the SMD electronic components at a predefined distance from the transferring element.

17. The method for assembling a rotary electrical machine according to claim 16, and further comprising feeding forward the at least one of the SMD electronic components toward the transferring element by an amount which is at least equal to the predefined distance; the feeding forward including soldering the transferring element to the at least one of the SMD electronic components and the transferring element onto the pad and soldering the at least one of the SMD electronic components onto the pad.

* * * * *